Figure 1:
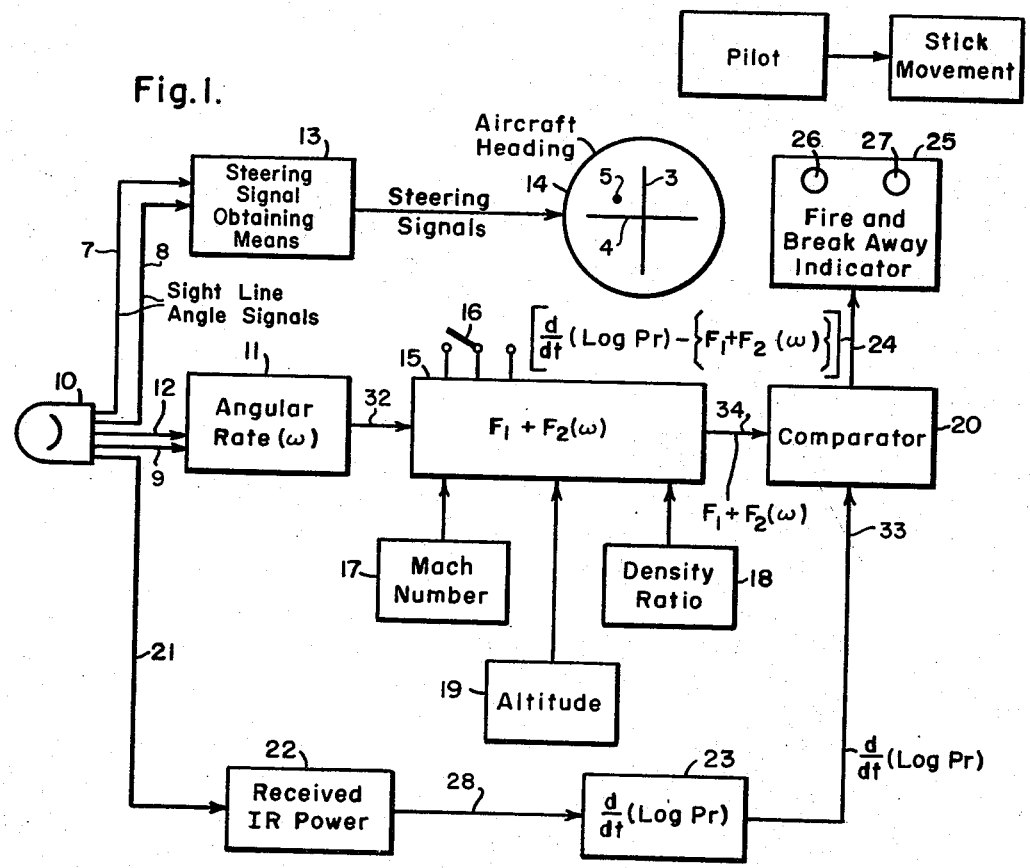

May 12, 1964      K. N. SATYENDRA      3,133,188
INFRARED MISSILE FIRE CONTROL SYSTEM
Filed Sept. 27, 1957

United States Patent Office 3,133,188
Patented May 12, 1964

3,133,188
INFRARED MISSILE FIRE CONTROL SYSTEM
Kudumalakunte N. Satyendra, Glen Burnie, Md., assignor to Westinghouse Electric Corporation, East Pittsburgh, Pa., a corporation of Pennsylvania
Filed Sept. 27, 1957, Ser. No. 687,598
13 Claims. (Cl. 235—61.5)

This invention relates to fire control systems and more particularly to infrared fire control systems particularly adapted for launching air-to-air guided missiles.

Heretofore, infrared tracking systems have not been successfully applied to an infrared fire control system for interception of airborne targets and launching of guided missiles toward these targets for the reason that no accurate method of extracting range information from the received infrared energy has as yet been developed, and as will be readily understood, the guided missile must not be launched from a distance exceeding its useful range, nor from a distance less than its minimum firing range.

The apparatus of the instant invention provides a simple method of operation for an accurate missile fire control system which does not depend on the evaluation of range information. The apparatus of the instant invention supplies all the other information normally supplied by a fire control system including steering information, signals for firing missiles with a good degree of hit probability, and signals for breaking off the combat in order to safeguard the aircraft and the pilot from collision with the enemy target.

In the apparatus of the instant invention an infrared scanner mounted on the pursuit aircraft searches, locks on, and tacks a target and provides information regarding the line of sight between the aircraft and the target to a heading indicator, and the indication thereon is utilized by the pilot in controlling the stick to follow a pure pursuit course. From the infrared scanner, angular rate information is also obtained and this angular rate information is employed in computing a signal in accordance with the Mach number of the aircraft speed and the density ratio in accordance with the altitude of the aircraft for use in a signal comparator. From the infrared scanner a signal representing received infrared power is also obtained and utilized in computing a time derivative signal which is a function of the logarithm of the received power, for application to the comparator, and from the comparator an additional signal is obtained which is applied to a fire and breakaway indicator which indicates to the pilot when the pursuit aircraft is within firing range, and when the pursuit aircraft has gotten too close to the target and should break away to seek another target or follow a reattack course.

Accordingly, the primary objective of the invention is to provide a new and improved infrared missile fire control system.

Another object is to provide a new and improved infrared missile fire control system particularly suitable for launching air-to-air guided missiles.

A further object is to provide a new and improved infrared missile fire control system in which the necessity for accurate range information is eliminated.

Figure 2:
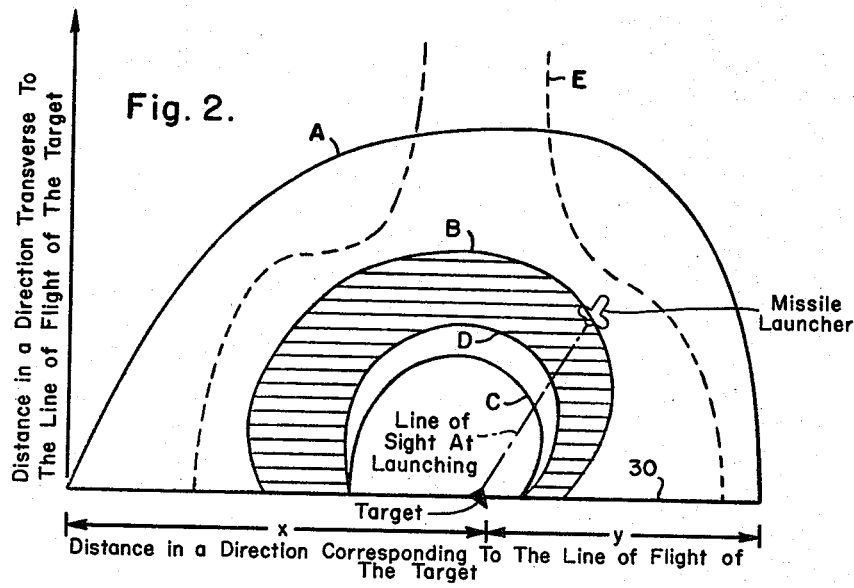

Other objects and advantages will become apparent after a perusal of the following specification when read in connection with the accompanying drawings, in which:

FIGURE 1 is a schematic diagram, in block form, of an infrared missile fire control system according to the preferred embodiment of the invention; and FIG. 2 is a graph illustrating the operation of the apparatus of FIG. 1.

In FIG. 1, to which particular attention is directed, there is shown at 10 an infrared scanning apparatus which may be of any convenient design, the scanning and searching apparatus 10 being constructed and arranged to lock on and track a target. The infrared detector portion of 10 may include, if desired, a PbS cell. For a fuller discussion of infrared detector devices reference may be had to "Detection and Measurement of Infrared," by Smith, Jones, and Chasmar, Oxford Clarendon Press, 1957. The angular rates of the line of sight to the target with respect to the longitudinal axis of the aircraft are measured in a convenient manner as by gyroscopes suitably mounted with respect to the gimbal axes of the infrared seeker of the scanning apparatus, and the scaler value $\omega$ of the total sight line angular rate is measured or obtained through a summing device of any convenient design and indicated in block form at 11, the angular rate computer 11 being operatively connected to the infrared scanner 10 by means 9 and 12. Assuming for purposes of illustration that device 10 supplies two angular rates measured in two mutually perpendicular directions, apparatus 11 may obtain a total angular rate by a process including summing the squares of the angular rate signals on lead means 9 and 12. For a more detailed discussion of the use of rate gyroscopes to obtain angular rate measurements, reference may be had to "Guidance" by Locke and others, D. Van Nostrand Co., Inc., 1955, pp. 350–353. There is also provided from the infrared scanner 10 information regarding the sight line angle which may include two sight line angle signals giving measurements of sight line angles in two mutually perpendicular planes both passing through the longitudinal axis of the aircraft, and steering signals are obtained as by apparatus shown in block form at 13 and applied to an aircraft heading indicator 14 which may be of any convenient design such, for example, as an optical device or a cathode ray device. Let it be assumed that lead means 7 and 8 provide two signals representing sight line angles, there are obtained at 13 steering signals for positioning a target indication 5 on azimuth scale 4 and elevation scale 3 of indicator 14. The pilot of the aircraft utilizes the signal on indicator 14 to operate the stick to provide that the aircraft follows a pure pursuit course.

The aforementioned angular rate signal $\omega$ is applied by lead means 32 to computing apparatus which may be of any convenient design and shown in block form at 15, computing apparatus 15 having switching means 16 of any convenient design for setting in or removing a multiplying factor for one term of a fire control equation, for reasons which will become hereinafter more clearly apparent. Supplied to the computer 15 in addition to the angular rate signal $\omega$ are signals corresponding to the Mach number of the aircraft speed obtained from any suitable source 17, a signal corresponding to density ratio in accordance with the altitude of the aircraft and obtained from any suitable source 18, and under some conditions a signal corresponding to the altitude of the aircraft and obtained from any suitable source 19. The output of computer 15, generally expressed by the form $$F_1 + F_2(\omega)$$

is applied by lead means 34 to a signal comparator device shown in block form and generally designated 20, the signal comparator 20 being provided for reasons to be hereinafter more clearly apparent.

The signal on lead 32 corresponding to angular rate ($\omega$) may be either a voltage or current, as desired. Computer 15 may include simple addition, subtraction, multiplication, and division circuits, such, for example as circuits similar to those described in "Electronic Analog Computers" by Korn and Korn, 1st Ed., McGraw-Hill Book Company, 1952.

Firing signals can be expressed in the form $$\frac{-\mathring{R}}{R} = \frac{F_1}{2} + \frac{F_2}{2}(\omega),$$

in which $R$ = range between launcher and target
$\mathring{R}$ = range rate
$\omega$ = angular rate of line of sight
$F_1$ and $F_2$ are functions of launcher speed, altitude, missile aerodynamics, missile time of flight, etc.

As aforementioned, the apparatus of the instant invention obviates the necessity for computing accurate range information. Furthermore, in the apparatus of the instant invention, $F_1$ and $F_2$ may be simply computed in terms of Mach number and density ratio after certain constants have been empirically determined or statistically selected in accordance with known missile time of flight and/or known minimum useful missile terminal velocity characteristics of the selected missile. For a more detailed discussion of these factors reference may be had to "Aerodynamics, Propulsion, Structures and Design Practice," by Bonney, Zucrow, and Besserer, Van Nostrand Co., Inc., 1956.

In accordance with a first setting of switch 16, and assuming for purposes of illustration certain missile aerodynamic values, the values of $F_1$ and $F_2$ may be computed as follows:

$$F_1 = C\frac{M_f}{1.6}$$

where $M_f$ = Mach number, and $$C = F_1$$

computed according to the second switch setting, and $$F_2 = 2.227[1 + .486\sigma + .236\sigma^2 + \ldots]$$

where $\sigma$ = density ratio at operating altitude.

In accordance with the second setting of switch 16, and assuming the same missile aerodynamic values, $F_1$ and $F_2$ may be computed as follows:

$$F_1 = .0132[1 + 1.45\sigma + 2.10\sigma^2 + \ldots]$$

where $\sigma < 0.4$ or the altitude is below 28,000 feet or $$F_1 = .0315$$

where $\sigma > 0.4$ or the altitude is below 28,000 feet; and, as before $$F_2 = 2.227[1 + .486\sigma + .236\sigma^2 + \ldots]$$

The $\sigma^2$ terms may be eliminated from the computation where desired to simplify the computing apparatus without too great a loss of accuracy.

As aforementioned, the constants in the values of $F_1$ and $F_2$ are empirically determined in accordance with the characteristics of the actual missiles selected to be used, and 1.6 is the estimated maximum closing speed in Mach between a chosen bomber target and a chosen fighter aircraft flying toward each other. Because $M_f/1.6$ will always be less than unity for the selected fighter which has a maximum speed of Mach 1, the value of $F_1 + F_2$ will be greater in the second switch setting than it is in the first setting of switch 16, assuming $\sigma$ and $\omega$ are unchanged.

As aforementioned, the infrared scanner 10 also provides by way of conducting means 21 a signal which is itself proportional to received I-R power, or can be utilized by apparatus 22, of any convenient design, to provide on output lead means 28 a signal proportional to received infrared power. From the apparatus 22 a signal is supplied by lead means 28 to computing apparatus of any convenient design, shown in block form and generally designated 23, for computing a signal corresponding to $$\frac{d}{dt}(\log Pr)$$

This last-named signal is applied by lead means 33 to comparator 20. A signal having a value corresponding to $$\frac{d}{dt}(\log Pr)$$

can be conveniently obtained at 23 by first applying the signal on lead 28 to a logarithmic amplifier such for example as one similar to that described in an article by Chambers and Page entitled "High Accuracy Logarithmic Receiver," Proc. I.R.E., vol. 42, No. 8, page 1307, August 1954. The output of the logarithmic amplifier included in 23 may then be applied to a differentiator circuit, such as one similar to those described in "Electronic Instruments" by Greenwood, Holdam, and Macrae, vol. 21, Radiation Laboratory Series, McGraw-Hill Book Company, 1948, pp. 64–78.

The received infrared power, if the range-dependent attenuation of the atmosphere is neglected as it may be especially at high altitudes, is given by the expression $$Pr = \frac{K_1}{R^2}$$

where $R$ = instantaneous range, and
$K_1$ = seeker constant.

The time derivative of this last equation yields $$\frac{dPr}{dt} = \frac{-2K_1}{R^3}(\mathring{R})$$

where, as before stated, $\mathring{R}$ = rate of change in range

The ratio of the last two expressions gives $$\frac{2Pr}{\frac{dPr}{dt}} = \frac{-R}{\mathring{R}}$$

In the subject apparatus, the received power is preferably measured by a logarithmic receiver included in 23, and the time derivative of this quantity is given by $$\frac{d}{dt}(ln\ Pr) = \frac{1}{Pr}\frac{dPr}{dt}$$

Twice the reciprocal of the last-named equation is the quantity:

$$\frac{-R}{\mathring{R}}$$

The missiles are successfully launched by the pilot, who by the use of comparator 20 compares the quantities of the following equation $$\left[\frac{d}{dt}(\log Pr)\right] \gtreqless [F_1 + F_2(\omega)]$$

As aforementioned, the left-hand side of this last stated equation is measured from the received infrared power whereas the right-hand side of the equation is computed from the altitude or density ratio, fighter speed, and infrared seeker gimbal axle rate measurements. The comparison of the instant quantities of the two sides of the equation is made by comparator 20, which supplies signals by conducting means 24 to a fire and break-away indicator 25 which may have green and red lights 26 and 27, respectively, for indicating to the pilot when he comes within firing range, and when he has approached to within a dangerous distance and should break away.

In FIG. 2, the curves illustrate the zones for a typical missile having its own guiding system, for example, K band radar homing apparatus. The radar apparatus on the missile may be if desired of the passive detection type depending upon radar illumination of the target by a radar transmitter located on the pursuit aircraft or missile launcher—; same line, after the period insert—The coordinate scales of FIG. 2 represent distances from the target, in directions parallel to and transverse to the line of flight 30 of the target T. All of the contour curves of FIG. 2 lie in the same plane, a horizontal plane passing through the target. It should be understood that similar contours could be provided for attack in any other plane rotated 360 degrees about target line of flight 30, but that the other contours in non-horizontal planes might not be spaced in the same manner as those of FIG. 2 because of gravity forces aiding or opposing the normal aerodynamic range of the guided missile. Curve A indicates the maximum aerodynamic range of a typical missile chosen for explanatory purposes; curve or contour B represents the area covered by the "In-range" signal, when $$\frac{d}{dt}(\log Pr) = F_1 + F_2(\omega)$$

for a first switch position or setting of switch 16 and resulting values of $F_1$ and $F_2$; curve C represents the minimum range of the selected missile depending upon such factors as safe fuse arming time, minimum time required for activation of missile control surfaces, and so forth; curve D represents the "final launch" signal, computed according to the following equation:

$$\frac{d}{dt}(\log Pr) = F_1 + F_2(\omega)$$

where the switch 16 is in its second switch setting, and $F_1$ and is desired $F_2$ have values different from their former ones; and curve E represents the active missile seeker lock-on range for a typical K band radar target seeker or infrared target seekers located on the guided missile.

It will be noted that distance (y) is smaller than distance (x) measured on target flight path 30 because of the direction of movement of the target from right to left as seen in FIG. 2.

Assume for purposes of description that the interceptor aircraft is tracking a target in a pure pursuit mode with the computer 15 having its switch 16 in the first setting. It may be noted that the value of a signal on lead means 33 corresponding to $$\frac{d}{dt}(\log Pr)$$

may be expected to increase in amplitude as the range between target and pursuit missile launcher aircraft decreases. While the pursuit aircraft is outside of contour B, the right hand side of the equation hereinbelow is greater than the left hand side, and the indicator 25 is constructed and arranged to show that the difference $$\epsilon = \left[\frac{d}{dt}(\log Pr)\right] - [F_1 + F_2(\omega)]$$

is negative.

As the pursuit aircraft approaches nearer the target, the amplitude of the signal corresponding to $$\frac{d}{dt}(\log Pr)$$

increases and a point is reached at which $\epsilon$ changes sign, which may be indicated by energizing the aforementioned green lamp 26 of indicator 25, and the pilot may fire a missile or missiles, since the interceptor is within the permissible launch zone, as shown by the area lying between contours B and D of FIG. 2.

As soon as $\epsilon$ changes sign (or soon thereafter, or soon after firing the first missile), the pilot or gunner changes switch 16 to its second setting thereby increasing the value of $F_1$. The pilot may continue to fire missiles in succession until the indicator 25 shows that $\epsilon$ has changed sign for a second time, which may be indicated by energization of the other red lamp 27 of indicator 25. This means that the interceptor aircraft has crossed curve or contour D of FIG. 2. The interceptor must break away and go after a second target or prepare for reattack.

Whereas the invention has been shown and described with reference to its use on aircraft, it should be understood that the apparatus could be at a fixed location, the necessity for supplying Mach number to the computer 15 being eliminated.

While the invention has been shown and described with reference to an embodiment thereof which gives satisfactory results, it should be understood that modifications may be made and equivalents substituted without departing from the spirit and scope of the invention.

I claim as my invention:

1. In an infrared missile fire control system, in combination, first computing means responsive to infrared radiation received from a target for computing a first signal having a value corresponding to the time derivative of the received infrared power $$\frac{d}{dt}(\log Pr)$$

second computing means for computing a second signal having a value corresponding to $F_1 + F_2(\omega)$, where $F_1$ and $F_2$ are selected functions of launcher speed, missile aerodynamic characteristics, missile maximum range and at least one atmosphere condition in accordance with altitude and density ratio, and $\omega$ is the scalar value of the sight line rate between the launcher position and the target, and firing indicating means operatively connected to both said first and second computing means and having said first and second signals applied thereto, said firing indicating means being constructed and arranged to give a firing indication when said first and second signals attain equal values.

2. In an infrared missile fire control system, in combination, first computing means responsive to infrared radiation received from a target for computing a first signal having a value corresponding to the time derivative of the received infrared power $$\frac{d}{dt}(\log Pr)$$

second computing means for computing a second signal having a value corresponding to $F_1 + F_2(\omega)$ where $F_1$ and $F_2$ are selected functions of launcher speed, missile aerodynamic characteristics, missile maximum range and at least one atmosphere condition in accordance with altitude and density ratio, and $\omega$ is the scalar value of the instant sight line rate between the launcher position and the target, said second computing means including switching means for selecting one of two values of $F_1$, and firing indicating means operatively connected to both said first and second computing means and having said first and second signals applied thereto, said firing indicating means being constructed and arranged to give a firing indication when said first and second signals attain equal values.

3. In a missile fire control system for use on aircraft, in combination, infrared tracking means adapted to lock on a target, said infrared tracking means being constructed and arranged to provide a first signal having a value corresponding to the time derivative of the received infrared power $$\frac{d}{dt}(\log Pr)$$

said infrared tracking means being constructed and arranged to provide a second signal corresponding to the scaler value $\omega$ of the instant sight line rate between the launcher aircraft and target, computing means operatively connected to said infrared tracking means and having said second signal applied thereto, said computing means computing a third signal having a value corresponding to $F_1+F_2(\omega)$ where $F_1$ and $F_2$ are selected functions of launcher speed, missile aerodynamic characteristics, missile maximum range and at least one atmosphere condition in accordance with altitude and density ratio, and firing indicating means operatively connected to said infrared tracking means and to said computing means and having said first and third signals applied thereto, said firing indicating means being constructed and arranged to give a firing indication when said first and third signals attain equal values.

4. In an aircraft missile fire control system, in combination, computing means responsive to infrared radiation received from a target for providing a firing signal when $$\frac{d}{dt}(\log Pr) = F_1 + F_2(\omega)$$

where $$\frac{d}{dt}(\log Pr)$$

is the time derivative of the received infrared power, $\omega$ is the scalar value of the instant sight line rate between the launcher aircraft and target, and $F_1$ and $F_2$ are selected functions of launcher speed, missile aerodynamic characteristics, missile maximum range, and at least one atmosphere condition in accordance with altitude and density ratio, and indicating means operatively connected to said computing means and having said firing signal applied thereto, said indicating means utilizing the firing signal to provide a firing indicaton.

5. In a missile fire control system for use on aircraft, in combination, infrared tracking means adapted to lock on a target, computing means operatively connected to said tracking means and responsive to infrared radiation received from the target for providing a firing signal when $$\frac{d}{dt}(\log Pr) = F_1 + F_2(\omega)$$

where $$\frac{d}{dt}(\log Pr)$$

is the time derivative of the received infrared power, $\omega$ is the scalar value of the instant sight line rate between the launcher aircraft and target, and $F_1$ and $F_2$ are selected functions of launcher speed, missile aerodynamic characteristics, missile maximum range, and at least one atmosphere condition in accordance with altitude and density ratio, and indicating means operatively connected to said computing means and having said firing signal applied thereto, said indicating means utilizing the firing signal to provide a firing indication.

6. In an aircraft missile fire control system, in combination, computing means responsive to infrared radiation received from a target, means operatively connected to said computing means for supplying thereto a variable input corresponding to the instant value of a variable which is the scalar value of the sight line rate between the launcher aircraft and target, said computing means being responsive to infrared radiation received from the target for providing a firing signal when $$\frac{d}{dt}(\log Pr) = F_1 + F_2(\omega)$$

where $$\frac{d}{dt}(\log Pr)$$

is the time derivative of the received infrared power, and $F_1$ and $F_2$ are selected functions of launcher speed, missile aerodynamic characteristics, missile maximum range, and at least one atmosphere condition in accordance with altitude and density ratio, and indicating means operatively connected to said computing means and having said firing signal applied thereto, said indicating means utilizing the firing signal to provide a firing indication.

7. In an aircraft missile fire control system, in combination, infrared tracking means adapted to lock on a target, said infrared tracking means being constructed and arranged to provide a first signal having a value corresponding to the time derivative of the received infrared power $$\frac{d}{dt}(\log Pr)$$

computing means operatively connected to said infrared tracking means and having said first signal applied thereto, means operatively connected to said infrared tracking means and to said computing means for supplying to said computing means a variable second signal corresponding to the instant value of a variable $\omega$ which is the scalar value of the instant sight line rate between the launcher aircraft and target, said computing means being constructed and arranged to provide a firing signal when $$\frac{d}{dt}(\log Pr) = F_1 + F_2(\omega)$$

where $F_1$ and $F_2$ are selected functions of launcher speed, missile aerodynamic characteristics, missile maximum range, and at least one atmosphere condition in accordance with altitude and density ratio, and indicating means operatively connected to said computing means and having said firing signal applied thereto, said indicating means utilizing the firing signal to provide a firing indication.

8. In an aircraft fire control system for use with a homing type guided missile, in combination, infrared tracking means adapted to lock on a target, target position indicator means operatively connected to said infrared tracking means for indicating to the pilot of the aircraft the position of the target with respect to the instant heading of he aircraft, computer means, said infrared tracking means being constructed and arranged to provide to the computer means a pair of signals corresponding respectively to the time derivative of the received infrared power $$\frac{d}{dt}(\log Pr)$$

and to the scalar value $\omega$ of the instant sight line rate between the launcher aircraft and target, said computer means being constructed and arranged to provide a firing signal when $$\frac{d}{dt}(\log Pr) = F_1 + F_2(\omega)$$

where $F_1$ and $F_2$ are selected functions of launcher speed, missile aerodynamic characteristics, missile maximum range, and at least one atmosphere condition in accordance with altitude and density ratio, and indicating means operatively connected to said computer means and having said firing signal applied thereto, said indicating means utilizing the firing signal to provide a firing indication.

9. In an aircraft fire control system for use with a homing type guided missile, in combination, infrared tracking means adapted to lock on a target, target position indicator means for indicating to the pilot of the aircraft the position of the target with respect to the instant heading of the aircraft, first computing means operatively connected to said tracking means for computing a first signal having a value corresponding to the time derivative of the received infrared power $$\frac{d}{dt}(\log Pr)$$

second computing means operatively connected to said tracking means for computing a second signal having a value corresponding to $F_1+F_2(\omega)$ where $F_1$ and $F_2$ are selected functions of launcher speed, missile aerodynamic characteristics, missile maximum range and at least one atmosphere condition in accordance with altitude and density ratio, and is the scalar value of the instant sight line rate between the launcher aircraft and target, and firing indicating means operatively connected to both said first and second computing means and having said first and second signals applied thereto, said firing indicating means being constructed and arranged to give a firing indication when said first and second signals attain equal value.

10. In an infrared missile fire control system, in combination, infrared energy responsive means for obtaining a first signal having an instant value corresponding to the value of at least one variable quantity needed to ascertain the earliest launching time of the missile, computing means operatively connected to the infrared energy responsive means for obtaining a second signal having an instant value corresponding to the value of a second variable quantity needed to ascertain the earliest launching time of the missile, and launching indication providing means operatively connected to said infrared energy responsive means and to said computing means and constructed and arranged to utilize the first and second signals to provide a launching indication.

11. In an aircraft missile fire control system in which the instant values of a plurality of variable quantities are obtained and utilized to ascertain the earliest firing time of the missile at a selected target in accordance with the normal maximum range of the missile as determined by its normal launching velocity at zero altitude from a fixed position at a fixed target, and said firing time is estimated upon the basis of the added velocity of the launcher aircraft, the range and range rate betwen launcher and target, the angular rate of the line of sight, and the effects of atmosphere conditions upon said missile, in combination, infrared energy responsive means for obtaining a variable signal corresponding to the instant value of a selected variable quantity which is a function of range and range rate, means for computing a second variable signal in accordance with variations in the instant value of a variable quantity which is a function of launcher speed, angular rate, and said atmosphere condition, and means for comparing the values of said first and second signals to ascertain whether said firing time has occurred.

12. In an aircraft missile fire control system in which the instant values of a plurality of variable quantities are obtained and utilized to ascertain the earliest firing time of the missile at a selected target in accordance with the normal maximum range of the missile as determined by its normal launching velocity at zero altitude from a fixed position at a fixed target, and said firing time is estimated upon the basis of the added velocity of the launcher aircraft, the range and range rate betwen launcher and target, and the effects of atmosphere conditions upon said missile, in combination, infrared energy responsive means for obtaining a first variable signal corresponding to the instant value of a selected variable quantity which is a function of range and range rate, means for computing a second variable signal in accordance with variations in the instant value of a variable quantity which is a function of launcher speed and said atmosphere condition, and means operatively connected to the infrared energy responsive means and to the computing means for utilizing said first and second signals to ascertain whether said firing time has occurred.

13. In an aircraft missile fire control system in which the instant values of a plurality of variable quantities are obtained and utilized to ascertain the earliest firing time of the missile at a selected target in accordance with the normal maximum range of the missile as determined by its normal launching velocity at zero altitude from a fixed position at a fixed target, and said firing time is estimated upon the basis of the added velocity of the launcher aircraft, the range and range rate between launcher and target, the angular rate of the line of sight, and the effects of atmosphere conditions upon said missile, in combination, infrared energy responsive means for obtaining a variable signal corresponding to the instant value of a selected variable quantity which is a function of range and range rate, computing means, means operatively connected to said computing means for supplying inputs thereto corresponding to launcher speed, angular rate, and atmosphere condition, and means operatively connected to the infrared energy responsive means and to the computing means for providing an indication of said firing time.

References Cited in the file of this patent
UNITED STATES PATENTS
2,377,589   Sutcliffe _____ June 5, 1945